C. D. TILLISON.
TRAP OPERATING MEANS.
APPLICATION FILED FEB. 26, 1910. RENEWED MAY 24, 1911.
1,007,616.
Patented Oct. 31, 1911.
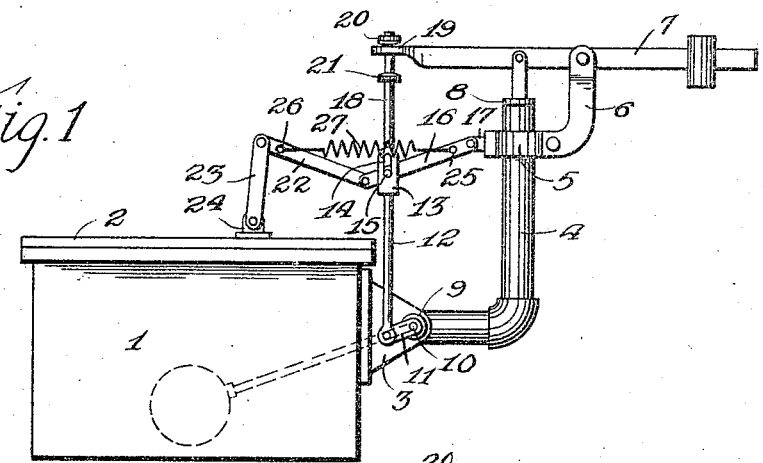
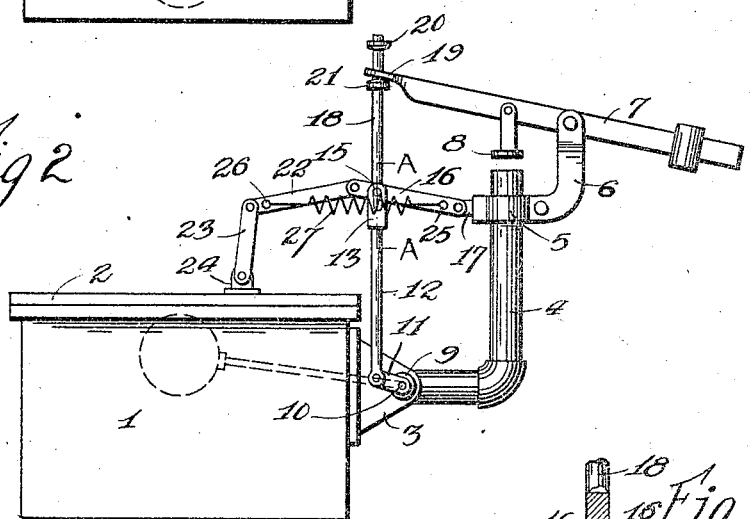
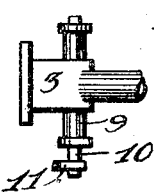
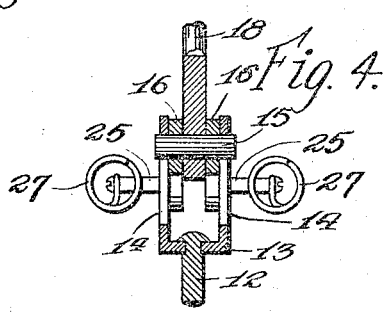
Witnesses.
H. A. Stock.
H. C. Schroeder
Inventor.
Charles D. Tillison,

UNITED STATES PATENT OFFICE.

CHARLES DAVID TILLISON, OF OAKLAND, CALIFORNIA.

TRAP-OPERATING MEANS.

1,007,616. Specification of Letters Patent. Patented Oct. 31, 1911.

Application filed February 26, 1910, Serial No. 546,110. Renewed May 24, 1911. Serial No. 629,447.

*To all whom it may concern:*

Be it known that I, CHARLES DAVID TILLISON, a citizen of the United States, residing at Oakland, in the county of Alameda and State of California, have invented certain new and useful Improvements in Trap-Operating Means, of which the following is a specification.

This invention relates to steam, vacuum, or like traps wherein a quick acting air valve is employed, and the principal object of the same is to provide the trap with means whereby the air valve will be automatically and quickly and suddenly opened when the usual float in the tank rises.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved trap, the air valve being closed. Fig. 2 is a similar view, the air valve being opened. Fig. 3 is a detail top plan view of the stuffing box for the trap. Fig. 4 is a fragmentary vertical sectional view taken on the line A—A, Fig. 2.

This invention is primarily intended as an improvement on my Patent No. 948,028 granted February 1, 1910, and embodies novel means which assures quick action in the opening and closing of the air valve and also provides means for holding the valve open when the float is up and holding the valve closed when the float is down.

Referring to said drawings by numerals, 1 designates the trap; 2 the cover thereof; 3 the bonnet that projects from one end of the trap and into which one end of the air supply pipe 4 projects. The clamp 5 that embraces the free upper portion of said pipe, is equipped with an upright supporting arm 6 which has the rocking lever 7 pivoted thereto, the outer end of which is provided with a weight. A valve 8 is suspended from said lever 7 and is adapted to be seated on the outer end of pipe 4 to seal the same. A stuffing box 9 is mounted in bonnet 3 and carries a rocker shaft 10 that is connected with a float in trap 1. Said shaft 10 has one of its projected ends equipped with a crank 11 that is pivotally connected to the lower end of a link 12. The structure described is substantially the same as that covered by my Patent 948,028 and is used as an example of a trap to which the improved valve operating means may be applied.

The upper end of link 12 is suitably attached to the base of a yoke 13 whose upright arms are provided with a longitudinal slot 14 which slidably receives the ends of a pivot bolt 15 that connects a pair of parallel link bars 16 said bars having one of their ends pivotally connected to a lug 17 that projects from clamp 5. Pivot bolt 15 retains the lower end of an operating rod 18 between said bars 16. Rod 18 has its upper portion slidably mounted in an opening formed through the flattened forward end 19 of lever 7. An upper abutment 20 and a lower abutment 21 are carried by the upper portion of rod 18, said abutments being suitably spaced to compensate for lost motion of said rod, and are adapted to elevate or depress lever 7 according to the movement of rod 18.

The forward ends of link bars 16 project through and beyond yoke 13 and are pivotally connected to one end of a link bar 22 which has its other end pivotally connected to the outer end of a link 23 that projects from a pivot ear 24 carried by the top 2 of trap 1. The link bars 16, adjacent their connection with clamp lug 17, are each provided with an outwardly projecting lateral lug 25 and link bar 22 adjacent its connection with link 23 is provided with lateral lugs 26. Lugs 25—26 are connected by spiral springs 27.

In operation, an upward movement of the float in the tank will cause link 12 to raise yoke 13. On its initial movement the slotted arms of yoke 13 will slide along pivot bolt 15 until the end of the slots contact with said bolt, whereupon the rod 18 and the toggle formed by bars 16, 22 and link 23 will be actuated, the toggle when rocked past the pivotal connection of bars 22 and 16 being projected upward automatically by the tension of springs 27 so that valve 8 is suddenly removed from pipe 4. On the down stroke of the float, valve 8 is similarly forced to its seats on pipe 4. As will be understood, the spring connection between bars 16 and 22 constantly exerts a tension to draw the outer end of said bars together, thereby producing means which prevents said bars being accidentally operated in a manner that would affect the valve 8.

What I claim as my invention is:—

1. A device of the character described comprising a trap, a supply pipe therefor, a valve controlling said pipe, a link operated by a means within said trap, a rod having a loose yoke connection with said link, means engaging said rod for operating said valve, a toggle having a pivotal connection with said pipe and said trap and also connected to said rod, and springs carried by said toggle for causing the same to accelerate the operation of said rod.

2. A device of the character described comprising a yoke, a crank arm secured to a rocker shaft within a stuffing box in the supply pipe of a trap, means within said trap for operating said rocker shaft, and a rod connecting said crank arm to said yoke, said yoke provided with side slots, a pivot bolt slidable in said slots, a valve operating rod having one end mounted on said bolt, a toggle also connected to said bolt, and means for causing said toggle to automatically accelerate the operation of said rod.

3. A device of the character described comprising a trap, a supply pipe, a valve mechanism mounted upon said pipe, a rod pivotally mounted on said pipe, and terminating in a yoke, a second rod mounted upon said valve mechanism, a pin slidably connecting said rod to said yoke, a pair of toggle arms pivotally mounted upon said pin, one end of said arms attached to said supply pipe, the free end of said arms pivotally mounted upon a supporting link upon said trap, springs mounted upon said arms, and a float within said trap for operating said rods.

4. A device of the character described comprising a trap, a supply pipe connected thereto, valve mechanism mounted upon said pipe, a rod pivotally connected to said supply pipe, one end of said rod provided with a yoke, a second rod, one end of said rod slidably connected to said valve mechanism, the other end slidably mounted within said yoke, a pair of toggle arms connected to said rods, means for supporting the ends of said toggle arms, a lug extending from each end of said toggle arms, a plurality of coil springs attached to said lugs to hold said arms in position to retain said valve either open or closed, and means within said trap for operating said mechanism.

In testimony whereof I affix my signature in presence of two witnesses.

CHARLES DAVID TILLISON.

Witnesses:
F. J. SCHROEDER,
H. C. SCHROEDER.